(12) United States Patent
Ogata

(10) Patent No.: US 9,379,936 B2
(45) Date of Patent: Jun. 28, 2016

(54) IP ADDRESS MANAGING METHOD, PROGRAM THEREOF, NETWORK COMMUNICATION DEVICE

(75) Inventor: Hideaki Ogata, Yokohama (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1135 days.

(21) Appl. No.: 13/357,375

(22) Filed: Jan. 24, 2012

(65) Prior Publication Data

US 2012/0191836 A1 Jul. 26, 2012

(30) Foreign Application Priority Data

Jan. 25, 2011 (JP) .................................. 2011-012654

(51) Int. Cl.
*G06F 15/173* (2006.01)
*H04L 29/12* (2006.01)

(52) U.S. Cl.
CPC ...... *H04L 29/1232* (2013.01); *H04L 29/12915* (2013.01); *H04L 61/2092* (2013.01); *H04L 61/6059* (2013.01); *H04L 29/12226* (2013.01); *H04L 61/2015* (2013.01)

(58) Field of Classification Search
CPC ............ H04L 61/2007; H04L 29/1232; H04L 29/12915; H04L 61/2092; H04L 61/6059; H04L 29/1226; H04L 61/2015
See application file for complete search history.

(56) References Cited

U.S. PATENT DOCUMENTS

| | | | | |
|---|---|---|---|---|
| 2006/0166699 | A1* | 7/2006 | Aghvami et al. | 455/552.1 |
| 2008/0205345 | A1* | 8/2008 | Sachs et al. | 370/332 |
| 2008/0297618 | A1* | 12/2008 | Niimura | 348/222.1 |
| 2010/0332598 | A1* | 12/2010 | Goyal et al. | 709/205 |
| 2011/0176531 | A1* | 7/2011 | Rune et al. | 370/338 |

FOREIGN PATENT DOCUMENTS

JP 11-196135 A 7/1999

* cited by examiner

*Primary Examiner* — June Sison
*Assistant Examiner* — Steven Nguyen
(74) *Attorney, Agent, or Firm* — Maschoff Brennan

(57) ABSTRACT

A method of managing IP addresses in a device performing communication using the IP address includes acquiring IP addresses by a plurality of methods; storing the plurality of IP addresses such that the methods are discernable when the plurality of acquired IP addresses are the same, determining an effective IP address used in the communication from the plurality of IP addresses according to predetermined priority in the methods, and setting the IP address to be used in the communication; and determining the valid IP address according to the priority from the stored IP addresses except for the disappearing IP address when the set IP address disappears, and setting the IP address to be used in the communication.

4 Claims, 4 Drawing Sheets

12

| | METHOD (1) | METHOD (2) | METHOD (3) | METHOD (4) |
|---|---|---|---|---|
| IP1 | IP1-a | – | IP1-c | IP1-d |
| IP2 | – | IP2-b | IP2-c | IP2-d |
| IP3 | IP3-a | – | IP3-c | – |

12

|  | METHOD (1) | METHOD (2) | METHOD (3) | METHOD (4) |
|---|---|---|---|---|
| IP1 | IP1-a | – | IP1-c | IP1-d |
| IP2 | – | IP2-b | IP2-c | IP2-d |
| IP3 | IP3-a | – | IP3-c | – |

|  | METHOD (1) | METHOD (2) | METHOD (3) | METHOD (4) |
|---|---|---|---|---|
| IP1 |  | – | IP1-c | IP1-d |
| IP2 | – | IP2-b | IP2-c | IP2-d |
| IP3 | IP3-a | – | IP3-c | – |

IP ADDRESS MANAGING METHOD, PROGRAM THEREOF, NETWORK COMMUNICATION DEVICE

BACKGROUND

1. Technical Field

The present invention relates to a method of managing IP addresses, and more particularly, to a method of managing IP addresses to improve convenience using a plurality of address acquisition methods under IPv6.

2. Related Art

In the related art, a network communication device such as a personal computer performing communication via the Internet has an IP address, which is an address on the Internet, and performs communication with other devices using that IP address. As a protocol of the communication, IPv4 (Internet Protocol Version 4) has been used, but there is the problem of a lack of IP addresses, and thus IPv6 (Internet Protocol Version 6) has been proposed.

Under IPv6, the address space is drastically expanded, one device can have a plurality of IP addresses, and a plurality of methods of acquiring IP addresses are provided.

In JP-A-11-196135, it is proposed that a large number of private IP addresses are associated with a small number of global IP addresses and are converted.

However, under IPv6 described above, when the same IP address is generated by different acquisition methods and duplicated, the address which can be obtained by any method of the acquisition methods is valid and can be used, and when the address obtained by the acquisition method disappears due to the valid lifetime or the like, the same IP address disappears. That is, the same address obtained by another acquisition method also disappears, even if the reason for disappearance does not occur in the address itself.

In this case, to continue using the IP address, a re-acquisition process is necessary again, this is not efficient, nor convenient.

SUMMARY

An advantage of some aspects of the invention is to provide a method of managing IP addresses, and to provide a method of managing IP addresses to improve convenience using a plurality of address acquisition methods under IPv6.

According to an aspect of the invention, there is provided a method of managing IP addresses in a device performing communication using the IP address, the method including: acquiring IP addresses by a plurality of methods; storing the plurality of IP addresses such that the methods are discernable when the plurality of acquired IP addresses are the same, determining an effective IP address used in the communication from the plurality of IP addresses according to a predetermined priority in the methods, and setting the IP address to be used in the communication; and determining the effective IP address according to the priority from the stored IP addresses except for the disappearing IP address when the set IP address disappears, and setting the IP address to be used in the communication.

In the method of managing IP addresses according to an aspect of the invention, the IP address may be acquired when the device is powered on.

In the method of managing IP addresses according to the aspect of the invention, the plurality of methods of acquiring the IP addresses may include a method of acquiring an IP address input by a user of the device, a method of acquiring an IP address generated by the device, a method of acquiring an IP address generated on the basis of a network address acquired from a router connected to the device, and a method of acquiring an IP address from a DHCP server connected to the device.

In the method of managing IP addresses according to the aspect of the invention, the priority of the method of acquiring the IP addresses input by the user may be the highest in the plurality of methods.

According to another aspect of the invention, there is provided a program for causing a device performing communication using an IP address to execute a process of managing the IP addresses, the process including: acquiring IP addresses by a plurality of methods; storing the plurality of IP addresses such that the methods are discernable when the plurality of acquired IP addresses are the same, determining a valid IP address used in the communication from the plurality of IP addresses according to predetermined priority in the methods, and setting the IP address to be used in the communication; and determining a valid IP address according to the priority from the stored IP addresses except for the disappearing IP address when the set IP address disappears, and setting the IP address to be used in the communication.

According to still another aspect of the invention, there is provided a network communication device performing communication using an IP address, wherein IP addresses are acquired by a plurality of methods, wherein the plurality of IP addresses are stored such that the methods are discernable when the plurality of acquired IP addresses are the same, a valid IP address used in the communication is determined from the plurality of IP addresses according to predetermined priority in the methods, and the IP address is used in the communication, and wherein the effective IP address is determined according to the priority from the stored IP addresses except for the disappearing IP address when the set IP address disappears, and the IP address is used in the communication.

Other objects and characteristics of the invention are clarified from embodiments of the invention to be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. However, the technical scope of the invention is not limited to the embodiments, and includes the description in Claims and the equivalents thereof.

Figure 1:
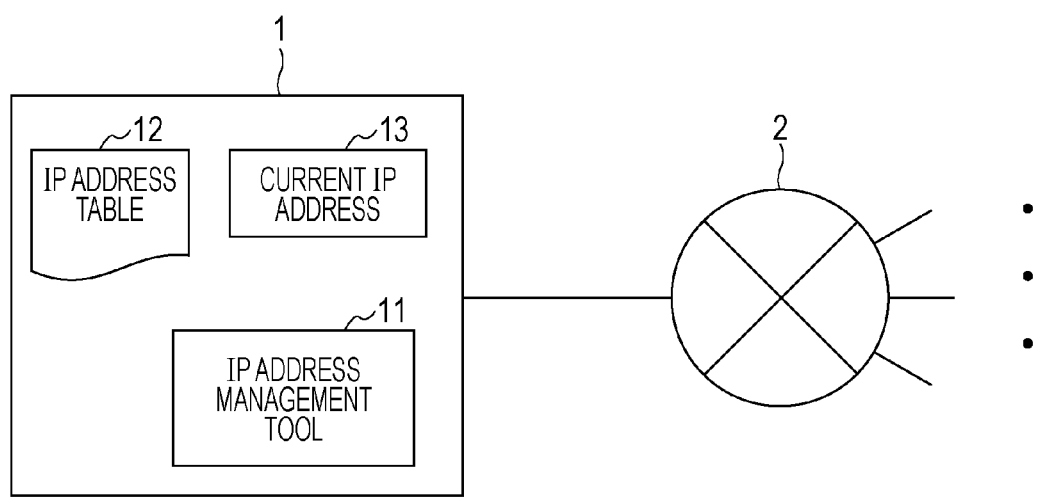
FIG. 1 is a diagram illustrating a configuration of a network communication device according to an embodiment of the invention.

FIG. 1 is a diagram illustrating a configuration of a network communication device according to an embodiment of the invention. The network communication device 1 shown in FIG. 1 is a device according to the embodiment. Even when IP addresses which can be obtained by different acquisition methods are duplicated, all of them are stored. When a valid address disappears, the address is kept so as not to disappear in which another address stored according to the predetermined priority becomes valid, to improve user convenience.

As shown in FIG. 1, the network communication device 1 can communicate with other communication devices via the Internet 2, and is configured herein by a personal computer as an example. Although not shown, the communication device 1 is provided with a CPU, a RAM, an HDD, a communication interface, a display device, an operation device, and the like. The communication via the Internet 2 is performed using IPv6. Although not shown in FIG. 1, the network communication device 1 is connected to a router and a DHCP (Dynamic Host Configuration Protocol) server.

As shown in FIG. 1, the network communication device 1 is provided with an IP address management tool 11, an IP address table 12, and a current IP address 13.

The IP address management tool 11 acquires and maintains the IP address described above, which is a characteristic of the network communication device 1, and a specific process thereof will be described later. The IP address management tool 11 is configured by a program stored in the HDD and the CPU performing a process according to the program. The program is provided in a network protocol stack which is in charge of the general function of communication as middleware serving between the OS layer and the application layer, to perform a function. The IP address management tool 11 is provided with four methods to be described later, as methods of acquiring the IP addresses.

The IP address table 12 is a table storing the IP addresses acquired by the IP address management tool 11 according to the acquisition methods, and is generated when the network communication device 1 operates, and stored in the RAM.

Figures 2A, 2B:
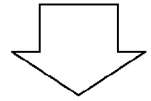
FIG. 2A and FIG. 2B are diagrams illustrating an example of an IP address table.

FIG. 2A and FIG. 2B are diagrams illustrating examples of the IP address table 12. FIG. 2A shows that three different IP addresses (IP1 to IP3) are acquired by four different acquisition methods as described above (method (1) to method (4)). In the example, the "IP1" is acquired according to the method (1), the method (3), and the method (4), all the acquired IP addresses are the same "IP1", but may be stored as "IP1-a", "IP1-c", and "IP1-d" in table 12, according to the acquisition methods. The same is applied to the "IP2" and the "IP3".

The method (1), the method (2), the method (3), and the method (4) are an acquisition method of reading an IP address input by a user of the network communication device 1 from the NVRAM, an acquisition method of receiving an IP address automatically generated by the network communication device 1, an acquisition method of receiving an IP address generated by acquiring a network address from the router, and an acquisition method of an IP address from the DHCP server. The IP addresses acquired by four different methods may be the same, and there may be the case shown in FIG. 2A and FIG. 2B.

In the IP address management tool 11, one IP address is valid in the same plurality of IP addresses. That is, when the same IP address is acquired by the plurality of methods, the IP address acquired by any one of the methods is set as the IP address used in the communication process at that time point and a usable IP address. The set effective IP address is referred to as the current IP address 13.

The current IP address 13 is stored in the RAM, and is used for reference at the time of communication based on e-mail. When there are a large number of the same IP addresses, it is determined that the address acquired by what method is the current IP address 13, according to predetermined priority for the methods. Herein, the alignment sequence shown in FIG. 2A and FIG. 2B represents the priority, and the priority is high in order of method (1), method (2), method (3), and method (4). Accordingly, in the example shown in FIG. 2A, the "IP1-a" becomes the current IP address 13 for the "IP1", the "IP2-b" becomes the current IP address 13 for the "IP2", and the "IP3-a" becomes the current IP address 13 for the "IP3".

Figures 3A, 3B:
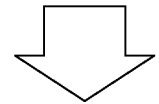
FIG. 3A and FIG. 3B are diagrams illustrating an example of a current IP address.

FIG. 3A and FIG. 3B are diagrams illustrating an example of the current IP address 13. FIG. 3A shows the current IP address 13 in the case shown in FIG. 2A. As described above, one current IP address 13 is set for each of the IP addresses different from each other.

Figure 4:
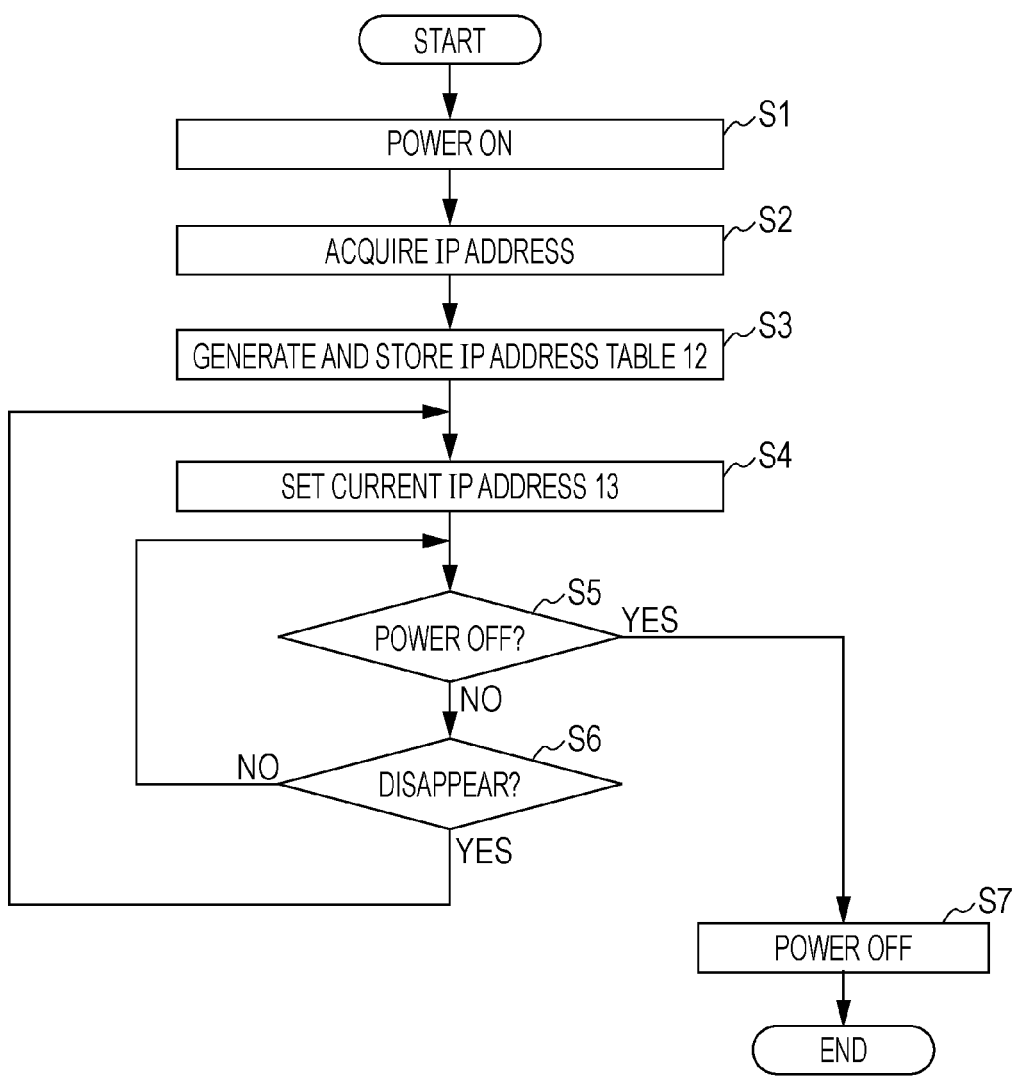
FIG. 4 is a flowchart illustrating an example of a process of managing IP addresses.

In the network communication device 1 having the configuration described above, there are characteristics in the method of managing the IP addresses, and a specific process sequence thereof will be described. FIG. 4 is a flowchart illustrating an example of a process of managing the IP addresses.

First, when the network communication device 1 is powered on (Step S1), the IP address management tool 11 performs a process of acquiring each IP address (Step S2). As described above, in the network communication device 1, the IP addresses are acquired by four acquisition methods. In the method (1), the IP address input (set) by the user is stored in the NVRAM, and thus the IP address is read and acquired. In the method (2), the network communication device 1 automatically generates the IP address, and thus the IP address is acquired. In the method (3), the network address is acquired by accessing the router, the IP address is generated on the basis thereof, and thus the IP address is acquired. In the method (4), the IP address generated by the DHCP server on access to the DHCP server is acquired. As exemplified in FIG. 2, the plurality of IP addresses may be acquired according to each of the methods.

Then, the IP address management tool 11 generates the IP address table 12 described above from the acquired IP address information, and stores the IP address table in the RAM (Step S3). The IP address management tool 11 determines the current IP address 13 for each of the same IP addresses according to the priority described above in the IP address table 12, and the IP address is set as the current IP address 13 in the RAM (Step S4). For example, the IP address table 12 shown in FIG. 2A is generated, and the current IP address 13 shown in FIG. 3A is set.

Then, the IP address provided in the current IP address 13 is appropriately used as the valid address in the communication process between the network communication device 1 and the other device.

Then, until the network communication device 1 is instructed to be powered off (Step S5: Yes), the IP address management tool 11 checks whether or not the IP address set as the current IP address 13 disappears (Step S6).

As a result of the check, when the IP address set as the current IP address 13 does not disappear (Step S6: No), the setting of the current IP address 13 is not changed, and the process returns to Step S5.

Meanwhile, when the IP address set as the current IP address 13 disappears (Step S6: Yes), the process returns to Step S4, and the current IP address 13 is reset. The IP address disappears when the valid lifetime of the IP address for which the valid lifetime is set has elapsed, when it is eliminated by the user, or when it is eliminated by any trouble.

In the resetting of the current IP address 13, the disappearing IP address is eliminated from the generated and stored IP address table 12, and the IP address with the highest priority is set as the current IP address 13 on the basis of the IP address table 12 after the update.

In the examples shown in FIG. 2A, FIG. 2B, FIG. 3A, and FIG. 3B, when the "IP1-a" disappears, the IP address table 12 is updated as shown in FIG. 2B, the priority of the "IP1-c" in the "IP1" is highest, and thus the "IP1-c" is set as the current IP address 13. At that time point, the current IP address 13 is in the state shown in FIG. 3B.

After resetting is performed as described above, the updated current IP address 13 is used in the communication process.

The check for disappearance of the IP address described above and the resetting of the IP address 13 based thereon are performed until the network communication device 1 is instructed to be powered off (Step S5: Yes).

When the network communication device 1 is instructed to be powered off (Step S5: Yes), the network communication device 1 is powered off (Step S7), and the series of IP address management processes is ended.

As described above, in the network communication device 1 according to the embodiment, even in the same IP address, in different acquisition methods, in other words, in different generating origins, all the IP addresses are stored as the IP address table 12. Even when the effectively used IP address disappears, the other stored address is set to be valid, and thus the same IP address is kept. Accordingly, even when the user does not perform a reset operation for the disappearing IP address, it is possible to continuously use the IP address, and it is possible to improve efficiency and convenience.

The priority is determined for each acquisition method, and the resetting of the effective IP address may be automatically performed.

In the embodiment, the network communication device 1 is a personal computer, but the invention may be applied to a communicable device or apparatus such as a printer.

The protective scope of the invention is not limited to the embodiment, and includes the invention described in Claims and equivalents thereof.

The entire disclosure of Japanese Patent Application No. 2011-012654, filed Jan. 25, 2011 is expressly incorporated by reference herein.

What is claimed is:

1. A method of managing IP addresses in a device performing communication using the IP address, the method comprising:

acquiring a plurality of IP addresses using a plurality of different methods by which the device acquires an IP address to communicate with a network;

storing the plurality of IP addresses along with the plurality of different methods by which the IP addresses are acquired in the device such that the different methods by which the IP addresses are acquired are discernable from the IP addresses, determining a valid IP address used to communicate with the network from the plurality of IP addresses according to a predetermined priority of the different methods if the plurality of IP addresses are the same, and setting the IP address to be used in the communication;

determining the valid IP address according to the priority from the stored IP addresses except for a disappearing IP address when a previously stored IP address expires; and setting the IP address to be used in the communication, wherein a corresponding IP address is associated and stored for each the plurality of methods of acquiring the IP addresses, and the methods of acquiring the IP addresses include a method of acquiring an IP address input by a user of the device, a method of acquiring an IP address generated by the device, a method of acquiring an IP address generated on the basis of a network address acquired from a router connected to the device, and a method of acquiring an IP address from a DHCP server connected to the device.

2. The method of managing IP addresses according to claim 1, wherein the IP address is acquired when the device is powered on.

3. The method of managing IP addresses according to claim 1, wherein the priority of the method of acquiring the IP addresses input by the user is highest in the plurality of methods.

4. A network communication device performing communication using a plurality of IP addresses corresponding to a variety of different methods by which the network communication device acquires an IP address to communicate with a network, the network communication device including a processor executing instructions stored in a non-transitory tangible storage medium, to provide:

an IP address table wherein the plurality of IP addresses are stored along with the plurality of different methods by which the plurality of IP addresses are acquired by the network communication device such that the different methods by which the IP addresses are acquired are discernable from the IP addresses, a valid IP address used to communicate with the network is determined from the plurality of IP addresses according to predetermined priority of the different methods if the plurality of IP addresses are the same, and the IP address is used in the communication, wherein the valid IP address is determined according to the priority from the stored IP addresses except for a disappearing IP address when a previously stored IP address expires, and the IP address is used in the communication, and wherein a corresponding IP address is associated and stored for each of the plurality of methods of acquiring the IP addresses, and the methods of acquiring the IP addresses include a method of acquiring an IP address input by a user of the device, a method of acquiring an IP address generated by the device, a method of acquiring an IP address generated on the basis of a network address acquired from a router connected to the device, and a method of acquiring an IP address from a DHCP server connected to the device.

* * * * *